United States Patent
Championnet

(10) Patent No.: US 9,395,383 B2
(45) Date of Patent: *Jul. 19, 2016

(54) APPARATUS AND METHOD FOR MEASURING ROTATION SPEEDS OF TIRES OF VEHICLE

(71) Applicant: Hyundai Autron Co., Ltd., Seongnam-si (KR)

(72) Inventor: Guy Championnet, Seoul (KR)

(73) Assignee: HYUNDAI AUTRON CO., LTD., Seongnam-Si (KR)

( * ) Notice: Subject to any disclaimer, the term of this patent is extended or adjusted under 35 U.S.C. 154(b) by 4 days.

This patent is subject to a terminal disclaimer.

(21) Appl. No.: 14/576,195

(22) Filed: Dec. 19, 2014

(65) Prior Publication Data

US 2015/0105987 A1 Apr. 16, 2015

Related U.S. Application Data

(63) Continuation of application No. 14/109,485, filed on Dec. 17, 2013, now Pat. No. 8,948,967.

(30) Foreign Application Priority Data

Dec. 18, 2012 (KR) .......................... 10-2012-0148853

(51) Int. Cl.
*B60C 23/00* (2006.01)
*G01P 3/44* (2006.01)
*B60C 23/06* (2006.01)

(52) U.S. Cl.
CPC .................. *G01P 3/44* (2013.01); *B60C 23/062* (2013.01)

(58) Field of Classification Search
USPC ................................................ 701/36, 70, 74
See application file for complete search history.

(56) References Cited

U.S. PATENT DOCUMENTS

| | | | | |
|---|---|---|---|---|
| 6,092,028 A | * | 7/2000 | Naito | B60C 23/061 702/138 |
| 7,639,157 B1 | * | 12/2009 | Whitley | G08C 17/02 340/870.02 |
| 8,948,967 B2 | * | 2/2015 | Championnet | G01P 3/44 116/34 R |

* cited by examiner

*Primary Examiner* — Yonel Beaulieu
(74) *Attorney, Agent, or Firm* — Mayer Brown LLP; Hyunho Park

(57) ABSTRACT

The present invention relates detecting the rotation speed of tires for a vehicle. In the present invention, signals are received from a plurality of wheel speed sensors, a reverse gear sensor, and a brake sensor. Errors of the wheel speed sensors are estimated using the received signals, a signal having a corrected error is obtained using the estimated errors, linear interpolation. Accordingly, there is an advantage in that rotation speed of tires for a vehicle can be determined accurately.

11 Claims, 15 Drawing Sheets

FIG. 14
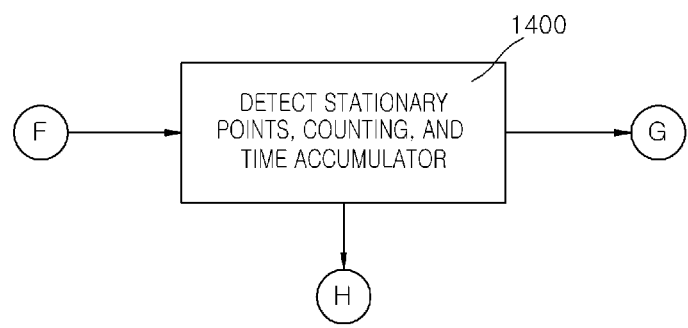
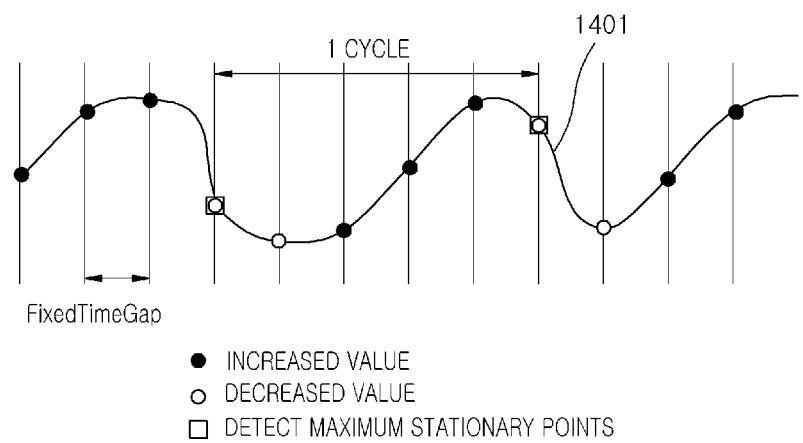
- ● INCREASED VALUE
- ○ DECREASED VALUE
- ☐ DETECT MAXIMUM STATIONARY POINTS FIG. 15
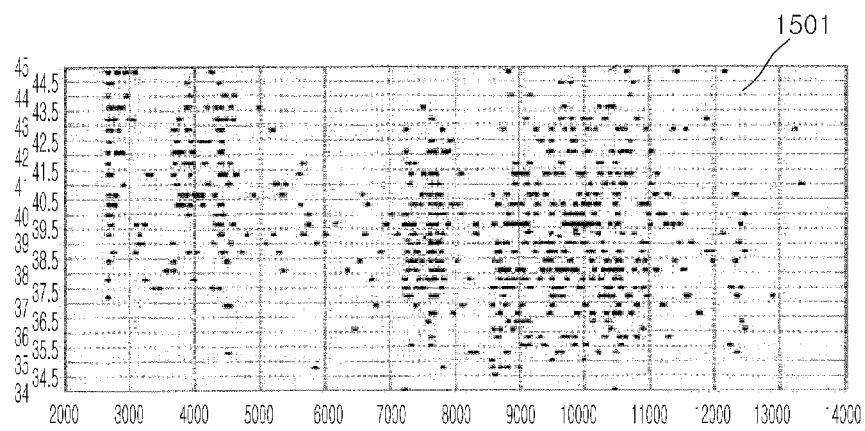
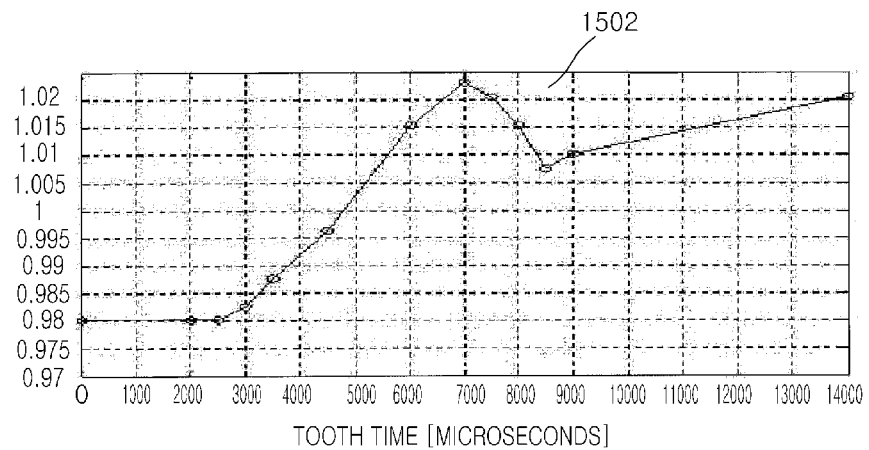
TOOTH TIME [MICROSECONDS]

APPARATUS AND METHOD FOR MEASURING ROTATION SPEEDS OF TIRES OF VEHICLE

PRIORITY

The present application is a continuation of the U.S. patent application Ser. No. 14/109,485, filed on Dec. 17, 2013, now U.S. Pat. No. 8,948,967, issued Feb. 3, 2015, which claims priority under 35 U.S.C. 119(a) to Korean Application No. 10-2012-0148853, filed on Dec. 18, 2012, in the Korean Intellectual Property Office, the disclosures of which are hereby incorporated by reference in their entireties.

BACKGROUND

Exemplary embodiments of the present invention relate to detecting the conditions of tires for a vehicle, and more particularly, to an apparatus and method for detecting the conditions of tires mounted on a vehicle, which enable a driver to monitor the conditions of tires while driving by measuring rotation speeds of the tires using a plurality of wheel speed sensors and determining the conditions of the tires based on the measured rotation speeds.

In general, an apparatus and method for detecting a reduction of air pressure within a tire mounted on a vehicle may be divided into two categories. One of the categories is a direct Tire Pressure Monitoring System (TPMS), and the other thereof is an indirect TPMS.

The direct TPMS is advantageous in that it can measure accurate pressure using a method of mounting sensors on tires and performing measurement, but is disadvantageous in that the direct TPMS is more expensive than the indirect TPMS because it includes several elements, such as a pressure measurement sensor unit mounted on a tire and a radio unit configured to send measurement values in a wireless way, and that the direct TPMS has a high failure rate. The direct TPMS may include, for example, U.S. Pat. No. 4,695,823.

The indirect TPMS has slightly lower accuracy than the direct TPMS, but has price competitiveness. The indirect TPMS adopts a method of estimating a loss of air pressure using a wheel speed sensor mounted on a vehicle and configured to measure rotation speed.

The vibration of a tire can be extracted based on the rotation of the tire. A corresponding vibration frequency is associated with pressure within the tire and is distributed near about 40 Hz. The amplitude of the vibration is influenced by a load that is added to the tire. A smaller amplitude that belongs to a signal generated by the vibration of a tire can be monitored in a rear tire rather than in a front tire. For example, in the case of a rear tire, a signal variation that is caused by a mechanical error of sawteeth attached to a wheel speed sensor has a repetitive pattern, and the signal variation has some influence on a wheel speed sensor signal. In order to compensate for such a phenomenon, a sawtooth error pattern needs to be confirmed and the wheel speed sensor signal needs to be then corrected.

Since such a sawtooth error pattern has no connection with a rapid change of time, a compensation value for compensating for a mechanical error of the wheel speed sensor can be rapidly determined through synchronization between a memorized pattern that is updated while driving and an actually monitored wheel speed sensor signal using a simple exponential smoothing method. Accordingly, the present invention further facilitates the analysis and characterization of tire conditions using a tire vibration signal. The present invention further facilitates measuring rotation speeds of the tires.

A tire resonant frequency can be estimated using a wheel speed sensor. However, the analysis of the tire resonant frequency requires a fixed time value at which a value of the wheel speed sensor is placed in an event domain, and the event is defined as the time that has elapsed between two consecutive sawteeth. For transform purposes from the event domain to the time domain, simple linear interpolation may be performed on rotation speed of the wheel speed sensor at the fixed time. If transform from the event domain to the time domain is performed, a band-pass filter may be used to separate tire torsion vibration components between 30 Hz and 50 Hz. A plurality of methods for identifying a resonant frequency is present. Fourier transform, such as that disclosed in U.S. Pat. No. 6,092,028, is one of representative examples. However, Fourier transform requires a large amount of data and also requires a heavy computational load in order to obtain desired results. As another method, a secondary linear model, such as that disclosed in U.S. Pat. No. 7,639,157, may be used. In the present invention, however, unlike in the conventional methods, a zero-crossing estimator method for detecting and counting stationary points is used.

SUMMARY

An embodiment of the present invention relates to an apparatus and method for estimating the conditions of tires mounted on a vehicle by combining data generated from a plurality of wheel speed sensors with other data generated when a brake operates or when a reverse gear operates.

Another embodiment of the present invention relates to the use of a signal generated from a wheel speed sensor. In particular, in the prior art, an error attributable to a mismatching angle is erroneously determined by a wheel speed sensor in which an angle between the sawteeth of the wheel speed sensor mounted on a tire is not the same due to limited mechanical accuracy in a manufacture process. In accordance with another embodiment of the present invention, a corrective factor is applied to correct the mismatching error.

In particular, if a sawtooth angle error of each sawtooth is determined in order to perform synchronization between an already estimated sawtooth angle error and a current wheel speed sensor signal, a corrective factor can be rapidly applied without performing operation again, and only update needs to be performed after the synchronization. If synchronization is not performed, a new sawtooth angle error is estimated.

Each sawtooth angle error is continuously precisely determined using an exponential smoothing method having a varying smoothing factor by assigning greater weight to recently monitored data and smaller weight to the past data.

Another embodiment of the present invention relates to synchronization between a memorized sawtooth angle error and a current wheel speed sensor signal using a Sum of Absolute Differences (SAD).

A value into which the actual sawtooth angle of a vehicle wheel has been reflected is estimated based on the results, and a rotational angular velocity (rad/second) for each wheel speed sensor is obtained.

Accordingly, the angular velocity of a fixed time interval can be measured, and corrected values can be obtained using an interpolation method. The fixed time interval is selected in such manner that a target frequency region of 40 Hz that is monitored is not affected by aliasing. Accordingly, in the present invention, an interval corresponding to 240 Hz is used as the fixed time interval.

If angular velocity values are calculated in the fixed time interval, the angular velocity values are used as values inputted to an Infinite Impulse Response (IIR) elliptic band-pass filter in order to attenuate frequencies outside a frequency region range of 30 Hz to 50 Hz.

After filtering, the tire vibration resonant frequency of each wheel is determined by counting stationary points. Such counting is performed for a specific time such that an obtained frequency estimation value has a multiple of a cycle that is detected during a monitoring time. The obtained estimated frequency is smoothed using the exponential smoothing method.

A value obtained by smoothing a corrective factor is used because a tire vibration frequency characteristic is influenced by the wheel speed of a vehicle wheel and thus a determined resonant frequency fluctuates over time. A two-dimensional (2D) corrective factor table including sawtooth time values and corrective factors corresponding to the sawtooth time values is used. The 2D corrective factor table is used in common between tires on the same axle. The same corrective factor table is applied to left and right front-wheel tires, and the same corrective factor table is applied to left and right rear-wheel tires.

Yet another embodiment of the present invention relates to enabling whether or not pressure within a tire mounted on a vehicle is abnormal using a cheap calculation device for a short time.

In one embodiment, an apparatus for detecting conditions of tires for a vehicle include a plurality of wheel speed sensors configured to generate signals corresponding to rotation speeds of the tires; a reverse gear sensor configured to generate a signal when a reverse gear operates; a brake sensor configured to generate a signal when a brake pedal operates; a control unit configured to receive the signals from the plurality of wheel speed sensors, the reverse gear sensor, and the brake sensor, calculate a signal having a corrected error by estimating an error of a wheel speed sensor, perform linear interpolation and band-pass filtering processing on the calculated signal, estimate a tire resonant frequency, calculate estimated tire pressure based on the estimated resonant frequency, and determine whether or not generate an alarm based on the calculated estimated tire pressure; and an alarm device configured to inform a driver of an inappropriate condition of a tire based on the determination of the control unit.

In particular, the control unit may include an input interface configured to receive the signals from the plurality of wheel speed sensors, the reverse gear sensor, and the brake sensor; a CPU configured to receive the signals from the plurality of sensors through the input interface and to perform operation for estimating resonant frequencies of the tires and estimating conditions of the tires using the estimated resonant frequencies; ROM configured to store a program comprising instructions; RAM read by the CPU when the program is executed and configured to store temporary data; E2PROM configured to store data for calibration, store result data of the operation, and store the data when power is turned off; and an output interface configured to transfer a signal to an external device.

In another embodiment, a method for detecting conditions of tires for a vehicle includes a sensor signal collection step of receiving signals from a plurality of wheel speed sensors and operation sensors mounted on the vehicle and processing the received signals; a sawtooth angle error estimation step of estimating sawtooth angle errors related to the mechanical defects of the wheel speed sensors; a wheel speed sensor error correction step of calculating a corrected sawtooth time and a corrected angular velocity of each of the wheel speed sensors using the estimated sawtooth angle errors; a fixed time interpolation step of interpolating an angular velocity at a fixed time interval using the corrected sawtooth time and the corrected angular velocity; a band-pass filtering step of filtering an interpolated signal in order to remove the torsional vibration of a corresponding tire from the interpolated signal; a frequency analysis step of estimating a vibration resonant frequency of the corresponding tire by counting stationary points from the filtered signal; a vehicle speed correction step of correcting the vibration resonant frequency that is an output value of the frequency analysis step in order to compensate for the influence of the speed of the vehicle; and an alarm determination step of determining conditions of the corresponding tire by calculating pressure within the corresponding tire based on the frequency corrected in the vehicle speed correction step. The method may further include an alarm step of informing a driver of the vehicle that a failure of the vehicle or a problem in tire conditions has been detected, after the alarm determination step.

Furthermore, the sensor signal collection step may include discarding data and not detecting tire conditions if the speed of the vehicle is determined to be a specific speed or less or a brake pedal or a reverse gear is determined to be driven; and when detecting an abnormal sawtooth signal due to noise based on a change of a sawtooth time, recovering the abnormal sawtooth signal.

Furthermore, the sawtooth angle error estimation step may include calculating a sawtooth angle error using a difference between a sawtooth time mean value and a sawtooth time middle value for one sawtooth, calculating a corrective offset by adding sawtooth angle errors for all sawteeth together, and estimating a sawtooth angle error for each of the sawteeth by subtracting the corrective offset from each of the sawtooth angle errors.

Furthermore, the wheel speed sensor error correction step may include calculating a corrective offset 'SADforOffset' using a standard variance of a sawteeth angle error profile for synchronization and a standard variance of a monitored sawtooth angle error and correcting an error of each of the wheel speed sensors using the calculated corrective offset.

Furthermore, the fixed time interpolation step may include calculating an interpolated angular velocity by performing linear interpolation on a corrected angular velocity value, corresponding to a corrected sawtooth time, at a fixed time interval.

Furthermore, the band-pass filtering step is performed using an Infinite Impulse Response (IIR) elliptic band-pass filter known as a Cauer filter having a uniform ripple behavior in a pass band and a stop band. The frequency analysis step may include estimating the tire vibration resonant frequency using a zero-crossing estimator for counting stationary points. More particularly, the frequency analysis step may include detecting the stationary points having relative maxima by detecting a 'FixedTimeFilteredValue$_i$,' value at which an increment is stopped, measuring a cycle by counting a number of fixed time intervals 'FixedTimeGap', and representing an instant frequency as a result value obtained by dividing a number of the cycles between a cycle measurement start and a cycle measurement end by accumulated fixed time intervals 'FixedTimeGap'.

Furthermore, the vehicle speed correction step may include calculating a corrective factor using a two-dimensional look-up table comprising pairs of a plurality of sawtooth time values and corresponding corrective factor values, calculating the corrected frequency by multiplying an instant frequency, estimated in the frequency analysis step, by the calculated corrective factor, and correcting the influence of the speed of the vehicle using the calculated frequency.

The alarm determination step may include determining a pressure condition of the corresponding tire by smoothing the frequency, corrected in the vehicle speed correction step, using an index smoothing method, transforming the smoothed frequency into an estimated pressure value, and comparing the estimated pressure value with a specific limit value.

In the apparatus and method for detecting conditions of tires for a vehicle, conditions of each of the tires for a left front wheel, a right front wheel, a left rear wheel, and a right rear wheel mounted on the vehicle are determined.

BRIEF DESCRIPTION OF THE DRAWINGS

The above and other aspects, features and other advantages will be more clearly understood from the following detailed description taken in conjunction with the accompanying drawings, in which:

FIG. 14 is a block diagram and a graph illustrating a frequency estimation principle in accordance with the present invention;

FIG. 15 is a block diagram, a graph, and a table illustrating that the rotation speed of a tire affects tire vibration in accordance with the present invention.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

When a vehicle travels on a road, the irregularities of a surface of the road become a cause of the vibration of tires mounted on the vehicle. In such vibration, a resonant frequency commonly fluctuates. This is because air pressure within the tires and the rotation speed of the tires are changed. As a result, the tires may enter a resonant mode due to a correlation between the spring constants of the tires associated with the tire air pressure and the moment of inertia generated by the mass of the vehicle. Accordingly, a reduction of air pressure within a tire can be monitored by detecting a change of the tire resonant frequency.

Figure 1:
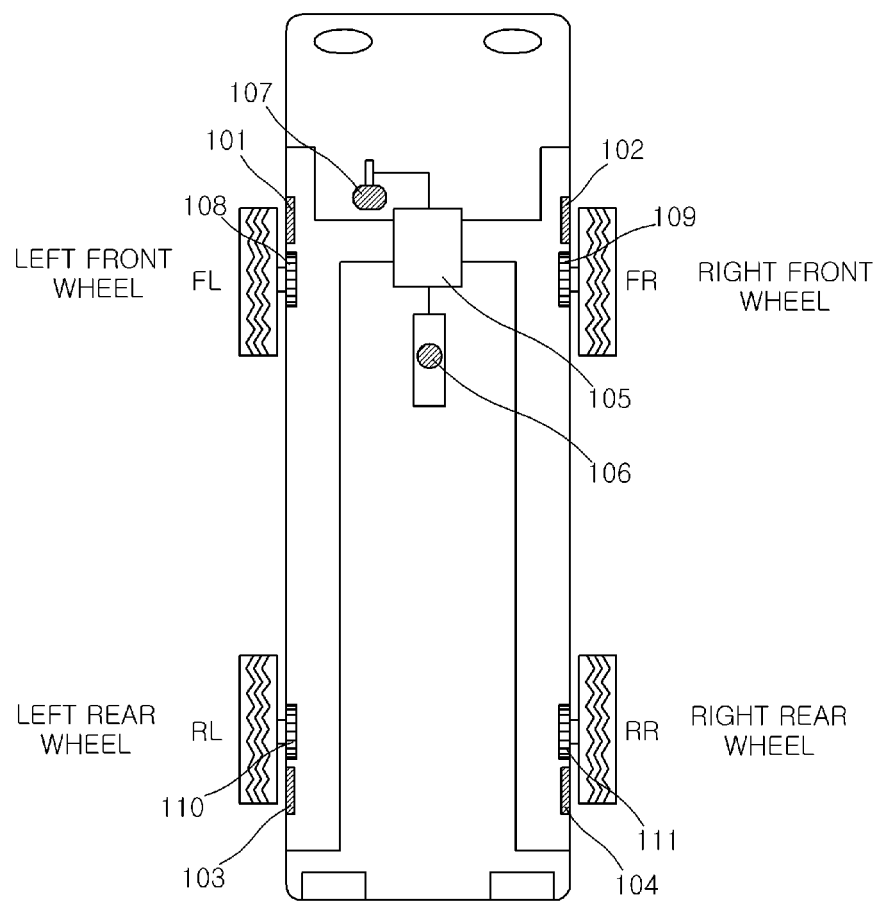
FIG. 1 is a diagram showing an embodiment of an apparatus for detecting the conditions of tires for a vehicle in accordance with the present invention.

FIG. 1 is a diagram showing an embodiment of an apparatus for detecting the conditions of tires for a vehicle in accordance with the present invention. FIG. 1 shows a wheel speed sensor 101 for a left front wheel, a wheel speed sensor 102 for a right front wheel, a wheel speed sensor 103 for a left rear wheel, and a wheel speed sensor 104 for a right rear wheel for measuring information about the rotations of the respective wheels when a specific number of pulses are generated by the rotations of the wheels. Sawteeth 108 to 111 coupled to the respective sensors 101 to 104 are mounted on respective tires.

All the pieces of information about the rotations of the wheels are transmitted to a control unit 105. A rear gear operation signal detected by a reverse gear sensor 106 and a brake operation signal detected by a brake sensor 107 are also transmitted to the control unit 105 and analyzed along with all the pieces of information about the rotations of the wheels.

Figure 2:
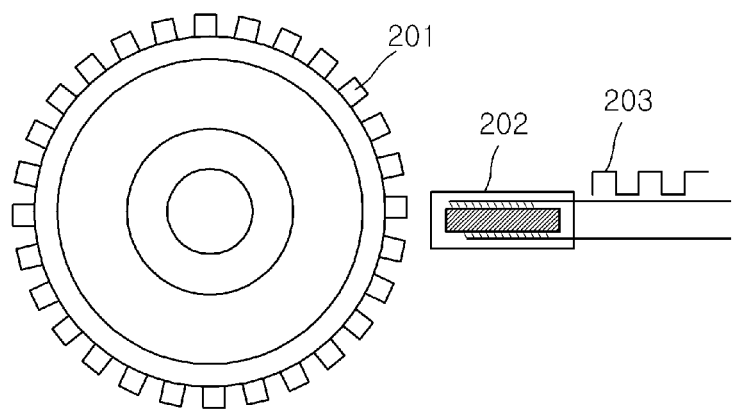
FIG. 2 is a diagram showing the sawteeth of a wheel speed sensor in accordance with the present invention.

FIG. 2 shows a wheel speed sensor system for measuring the rotation speed of a wheel. The wheel speed sensor system includes a circular disk 201 configured to have sawteeth formed therein and mounted on each of the shafts of a left front wheel, a right front wheel, a left rear wheel, and a right rear wheel and a pickup coil 202 mounted on a vehicle body and configured to extract each wheel speed-related signal. When one sawtooth on the disk 201 passes through the pickup coil 202, a current signal is changed. When the disk 201 is continuously rotated, a rotation signal waveform 203 is generated. An interval between the sawteeth and the angles of the sawteeth on the disk 201 may not be formed perfectly regularly due to low accuracy in a manufacture process. As a result, a measured electrical signal itself becomes inaccurate. Here, the time from the rising (or falling) edge of a pulse to a next rising (falling) edge is defined as an interval between sawteeth, that is, a sawtooth time 'ToothTime'.

Figure 3:
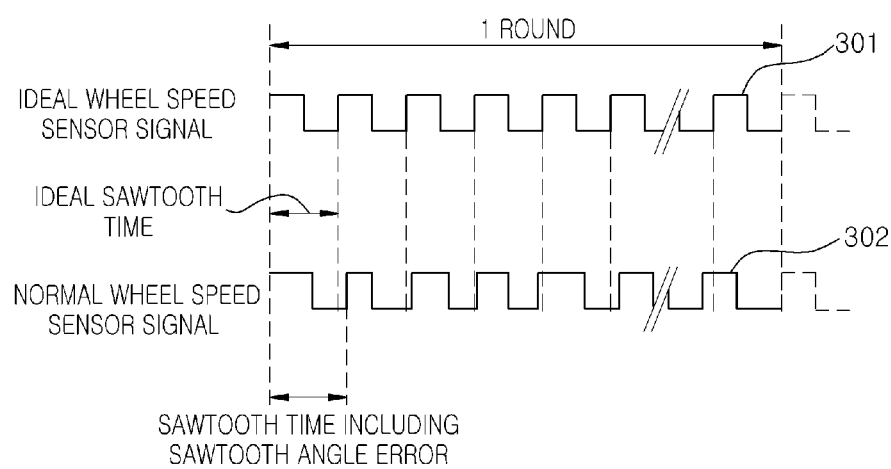
FIG. 3 shows a waveform illustrating that a wheel speed sensor signal is mechanically wrong in accordance with the present invention.

FIG. 3 shows a waveform illustrating that a wheel speed sensor signal is mechanically wrong in accordance with the present invention. There is shown a waveform measured by rotating the circular disk at specific rotation speed. An ideal waveform 301 shows that intervals between the sawteeth of the disk are ideally distributed, but an actual waveform 302 shows that inaccuracy generated in a manufacture process is included. From the ideal waveform 301 and the actual waveform 302, it can be seen that there is a difference between the intervals of pulses according to the sawteeth, but a total sum of interval errors for one rotation of the disk is 0.

Figure 4:
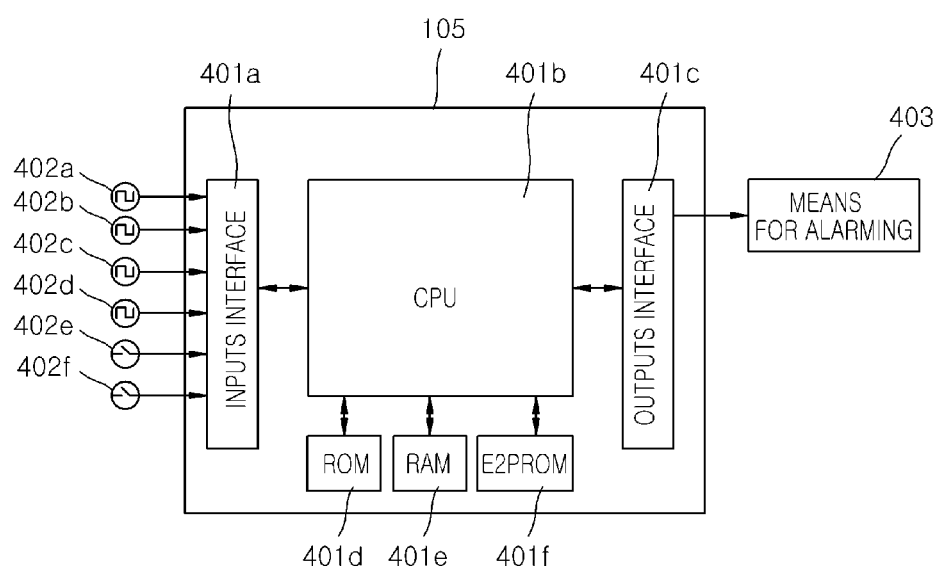
FIG. 4 is a block diagram showing the electrical configuration of a detection apparatus in accordance with the present invention.

FIG. 4 is a block diagram showing the electrical configuration of a detection apparatus in accordance with the present invention. As shown FIG. 4, the control unit 105 includes a Central Processing Unit (CPU) 401b, Read Only Memory (ROM) 401d configured to store a program including instructions, Random Access Memory (RAM) 401e read by the CPU 401b when the program is executed and configured to store temporary data, and E2PROM 401f configured to store data for calibration and result values in a previous step for calculation purposes in a next step according to the present invention. The control unit 105 further includes an input interface 401a for receiving signals from various sensor devices and an output interface 401c for transferring signals to an external device. Signals from the wheel speed sensor 101 for the left front wheel, the wheel speed sensor 102 for the right front wheel, the wheel speed sensor 103 for the left rear wheel, the wheel speed sensor 104 for the right rear wheel, the reverse gear sensor 106, and the brake sensor 107 are connected to the respective contact points 402a, 402b, 402c, 402d, 402e, and 402f of the input interface 401a. Here, the CPU 401b receives signals from the plurality of wheel speed sensors, the reverse gear sensor, and the brake sensor signal and performs operation for estimating tire conditions using the received signals. Furthermore, an alarm device 403 for informing a driver of an operation failure or an inappropriate condition of a tire may be connected to the output interface 401c. As a result, the control unit 105 performs a function of receiving signals from the plurality of wheel speed sensors, the reverse gear sensor, and the brake sensor, estimating an error of each wheel speed sensor, generating a signal having an error corrected, performing linear interpolation and band-pass filtering processing, estimating a tire resonant frequency, calculating estimated tire pressure from the estimated resonant frequency, and determining whether or not to generate an alarm. Furthermore, the conditions of each of the tires for the left front wheel, the right front wheel, the left rear wheel, and the right rear wheel mounted on the vehicle are determined.

Figure 5:
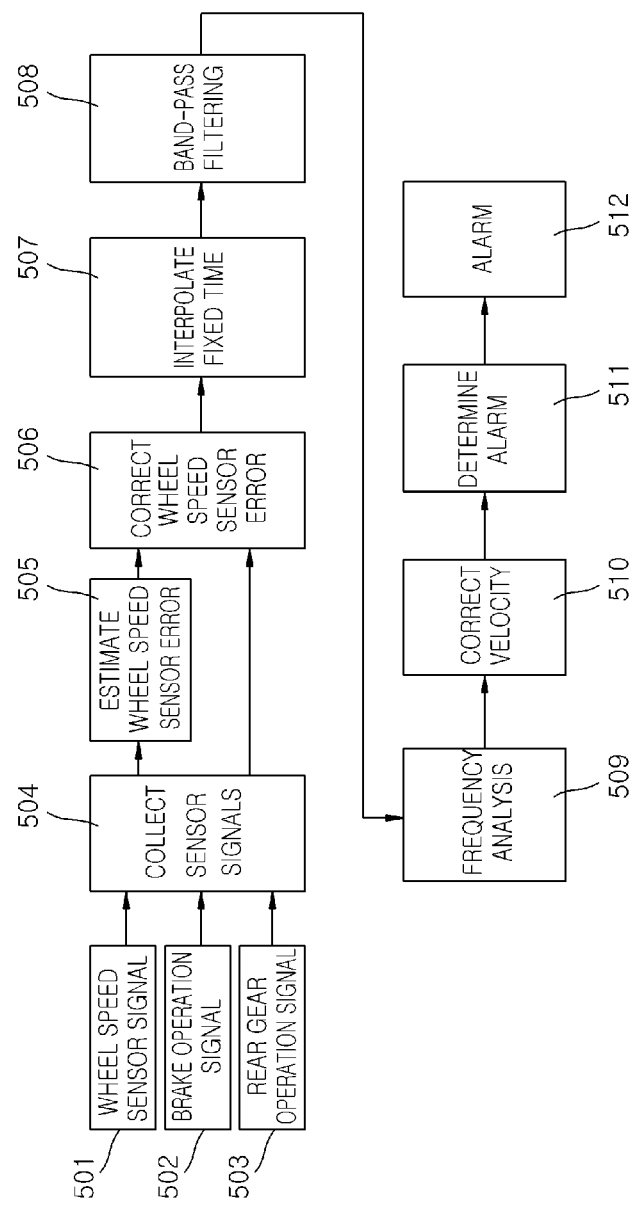
FIG. 5 is a block diagram showing the steps of a detection method in accordance with the present invention.

FIG. 5 is a block diagram showing the steps of a detection method in accordance with the present invention. The detection method is applied to the tires of the left front wheel, the right front wheel, the left rear wheel, and the right rear wheel.

In a sensor signal collection step 504, a wheel speed sensor signal 501 generated from each of the wheel speed sensor 101 for the left front wheel, the wheel speed sensor 102 for the right front wheel, the wheel speed sensor 103 for the left rear wheel, and the wheel speed sensor 104 for the right rear wheel, a brake operation signal 502 detected by the brake sensor 107, and a rear gear operation signal 503 detected by the reverse gear sensor 106 are collected. In the sensor signal collection step 504, if it is determined that the speed of the vehicle is a specific speed or less or a brake pedal or a reverse gear has been driven, data is discarded and tire conditions are not detected. If an abnormal sawtooth signal attributable to noise is detected, signals are recovered.

The signals collected at step 504 are not limited to the wheel speed sensor signal 501, the brake operation signal 502, and the rear gear operation signal 503, but may include various other signals.

In the sensor signal collection step 504, whether or not rotation speed of the sawteeth of each disk corresponding to the speed of the vehicle is a specific speed (e.g., 10 Km/h) or more. If, as a result of the determination, it is determined that the rotation speed is less than the specific velocity, data is discarded and no process is performed. Furthermore, whether or not the brake pedal or the reverse gear is driven is determined. If, as a result of the determination, it is determined that the brake pedal or the reverse gear has been driven, data is discarded and no process is performed. Furthermore, a wrong sawtooth signal is detected and processed. An edge of a signal waveform can be generated in response to a change of the wheel speed sensor signal attributable to electrical noise although a disk sawteeth does not actually pass through the pickup coil. Accordingly, a previous sawtooth time measurement value is compared with a current sawtooth time measurement value. If, as a result of the comparison, a change is, for example, 30% or more, the current sawtooth time measurement value is stored in memory, and the stored sawtooth time measurement value is added to a next sawtooth time measurement value. If the sum is, for example, less than 30%, the sum is used in a next step.

In a wheel speed sensor sawtooth angle error estimation step 505, a sawtooth angle error of each of the sawteeth is calculated using a difference between a sawtooth time mean value and a sawtooth time middle value, a corrective offset is calculated by adding sawtooth angle errors of all the sawteeth of the disk together, and a sawtooth angle error of each of the sawteeth is estimated by subtracting the corrective offset from each of the sawtooth angle errors.

That is, a sawtooth angle error of each of the sawteeth is estimated based on a difference between the calculation mean of the full single-round sawtooth time and a sawtooth time measured at a middle point (i.e., a sawtooth time when a half round is performed). The estimated results are used to obtain a synchronization offset between a memorized sawtooth error profile and a sawtooth time that is being measured. If synchronization is successful, a current estimated sawtooth angle error is updated to the sawtooth error profile. Furthermore, transform from the sawtooth time to a corresponding angular velocity is performed. If the synchronization is not successful, additional synchronization is attempted.

In a wheel speed sensor error correction step 506, if the synchronization is successfully performed, the memorized sawtooth error profile is used for operation for correcting the sawtooth time, and a corrected angular velocity for each wheel speed sensor is calculated. Accordingly, in the wheel speed sensor error correction step 506, an error of each wheel speed sensor is corrected by calculating a corrective offset 'SADforOffset' using a standard variance of the sawteeth angle error profile for synchronization and a standard variance of a monitored sawtooth angle error.

In a fixed time interpolation step 507, the corrected sawtooth time and the corresponding corrected angular velocity are known, and a corresponding rotational angular velocity is calculated using a linear interpolation method having a fixed time interval. As a result, in the fixed time interpolation step 507, an interpolated angular velocity is calculated by performing linear interpolation on a corrected angular velocity corresponding a corrected sawtooth time at a fixed time interval.

In a band-pass filtering step 508, band-pass filtering is performed on the interpolated angular velocity in order to extract a target frequency region to be analyzed. The extraction is performed using an IIR elliptic band-pass filter having the lowest frequency of 30 Hz to the highest frequency of 50 Hz.

Next, in a frequency analysis step 509, a tire vibration resonant frequency is determined by counting stationary points. Such counting is performed for a specific time such that an obtained frequency estimation value has a multiple of a cycle that is detected during a monitoring time. That is, in the frequency analysis step 509, the tire vibration resonant frequency is determined by a zero-crossing estimator for counting stationary points. More particularly, stationary points having relative maxima are detected by detecting a 'FixedTimeFilteredValue$_i$' value at which an increment is stopped, the cycle is measured by counting the number of fixed time intervals 'FixedTimeGap', and an instant frequency is represented as a result value obtained by dividing the number of cycles between a cycle measurement start and a cycle measurement end by an accumulated fixed time interval 'FixedTimeGap'.

In a vehicle speed correction step 510, a frequency value that is an output value obtained in the frequency analysis step 509 is corrected. In order to compensate for an estimated tire vibration frequency according to the influence of the speed of the vehicle, a corrective factor is obtained from a sawtooth time, and the corrective factor is applied to the estimated tire frequency.

Next, in an alarm determination step 511, an alarm pattern is started when a frequency lower than a frequency corresponding to low pressure is monitored for a specific time. More particularly, in the vehicle speed correction step 510, a corrected frequency is smoothed using an index smoothing method, the smoothed frequency is converted into an estimated pressure value, and the pressure conditions of a tire are determined by comparing the estimated pressure value with a specific threshold.

Next, in an alarm step 512, a vehicle driver is informed that a failure of the vehicle or a problem in tire conditions has been detected.

Figure 6:
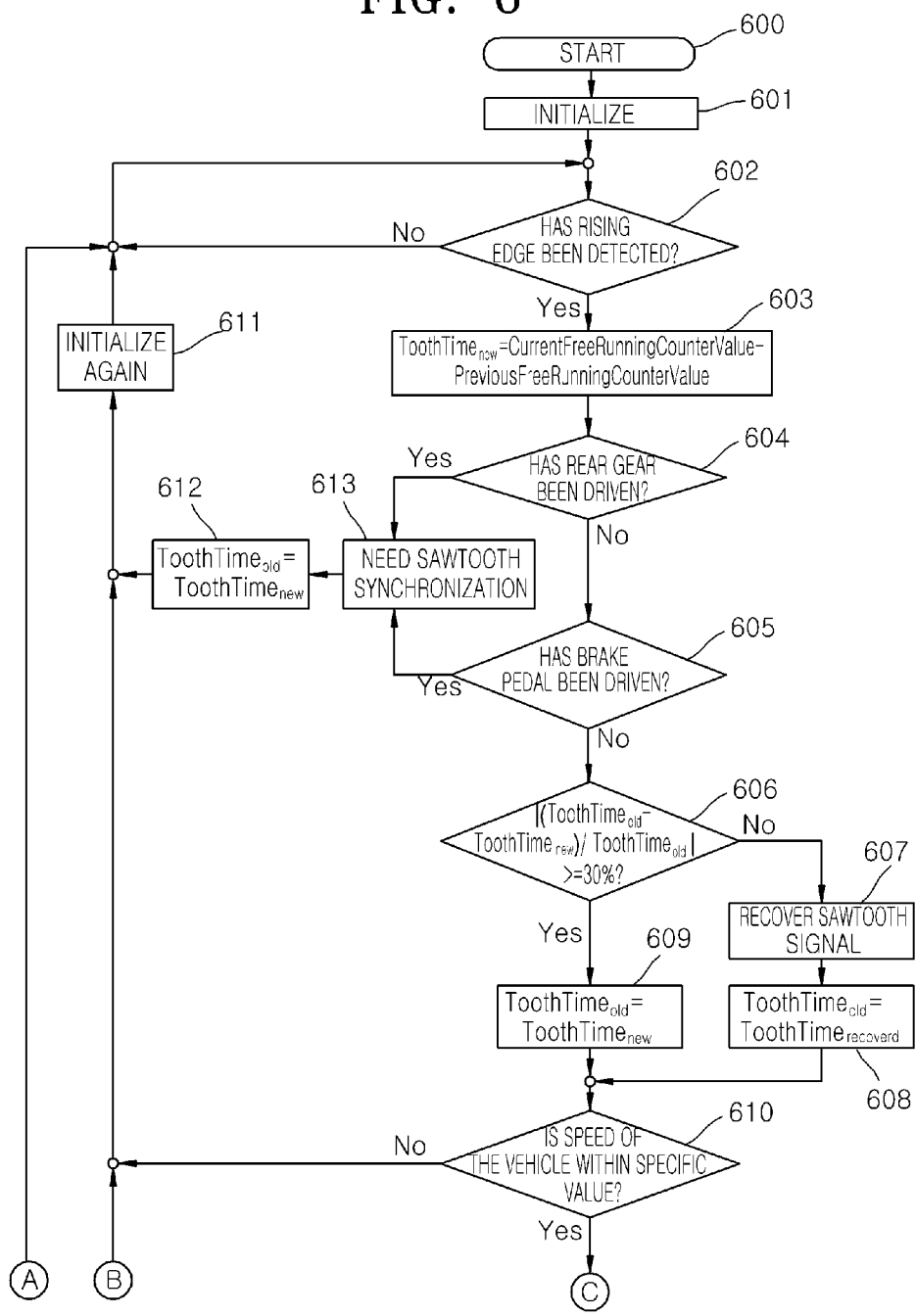
FIG. 6 is a flowchart illustrating the collection and processing of the sawtooth time of a wheel speed sensor signal in accordance with the present invention.

FIG. 6 is a flowchart illustrating the collection and processing of the sawtooth time of a wheel speed sensor signal in accordance with the present invention. FIG. 6 illustrates continuous steps for collecting the sawtooth time of a circular disk.

First, at step 601 that is an initialization step, all values for operation are initialized. A current sawtooth time 'ToothTime$_{new}$' is calculated by measuring the time that has elapsed between the last sawteeth edge and a current sawteeth edge. A CPU-level free-driven timer for counting the clock of a microprocessor is used for such calculation.

If the edge of a wheel speed sensor signal is detected at step 602, a value of the free-driven timer is copied to a parameter 'CurrentFreeRunningCounterValue'.

At step 603, a current sawtooth time 'ToothTimenew' is calculated by calculating a difference between the current value 'CurrentFreeRunningCounterValue' and a previous value 'PreviousFreeRunningCounterValue'.

In order to calculate a sawtooth time using such a method, a counter overflow case needs to be taken into consideration. That is, if a counter overflow is generated every time and thus the free-driven timer reaches a maximum value, the next value of a counter becomes 0. The free-driven timer is increased at a fixed interval under the control of the CPU. The increment time interval determines resolution of 'ToothTime-new'. For example, if the free-driven timer is increased by the microsecond, ToothTimenew has resolution of 1 microsecond.

At step 604, whether or not the reverse gear operates is determined. If, as a result of the determination, it is determined that the reverse gear operates, the sawtooth time is no longer used. If the vehicle moves backward, the speed sensor signal is driven in a reverse rotation direction. Accordingly, synchronization between the sawtooth signal of the wheel speed sensor and a sawtooth interval profile that is stored for signal correction needs to be performed.

If, as a result of the determination at step 604, it is determined that the reverse gear does not operate, whether or not the brake pedal operates is determined at step 605. If, as a result of the determination, it is determined that the brake pedal has been driven, the sawtooth time is no longer used. Synchronization between the sawtooth signal of the wheel speed sensor and the sawtooth interval profile stored for signal correction needs to be performed because braking power that affects tire vibration including braking vibration affects a corresponding tire.

If, as a result of the determination at step 605, it is determined that the brake pedal has not been driven, a change of the time between a previous sawtooth time 'ToothTime$_{old}$' and a current sawtooth time 'ToothTime$_{new}$' is calculated at step 606. If a change of the time does not exceed a specific value, for example, 30%, the measured value is determined to be an effective value. If a change of the time exceeds the specific value, for example, 30%, it is determined to be a measurement error, such as that more many sawteeth have been measured or no sawtooth has been measured. In such a case, step 607 is performed in order to recover a sawtooth signal.

At step 607, if the current sawtooth time is much smaller than the previous sawtooth time, that is, if (ToothTime$_{old}$−ToothTime$_{new}$)/ToothTime$_{old}$≥30%, assuming that a wrong additional tooth has been detected, the current sawtooth time 'ToothTime$_{new}$' is added to a next sawtooth time measurement value, and the addition result is stored as 'ToothTime$_{recovered}$' in order to overcome such abnormalities. If the 'ToothTime$_{recovered}$' is within the range of 30% as a result of comparison between the addition result 'ToothTime$_{recovered}$' and the previous sawtooth time 'ToothTime$_{old}$', that is, if |(ToothTime$_{old}$−ToothTime$_{recovered}$)/ToothTime$_{old}$|<30%, such a result is used instead of the current sawtooth time 'ToothTime$_{new}$' in a next step. If a change of the sawtooth time is too small, 'ToothTime$_{recovered}$' continues to be added to a next sawtooth time measurement value until an addition result 'ToothTime$_{recovered}$' falls within the range of 30%. Accordingly, if the sawtooth time is increased and the range of 30% is exceeded, that is, if (ToothTime$_{old}$−ToothTime$_{recovered}$)/ToothTime$_{old}$≤−30%, sawtooth synchronization is not required, a recovery task is no longer performed, and the addition result 'ToothTime$_{recovered}$' is used in a subsequent step.

If the current sawtooth time is much greater than the previous sawtooth time at step 607, that is, if (ToothTime$_{old}$−ToothTime$_{new}$)/ToothTime$_{old}$≤−30%, assuming that a missing tooth has been detected, the current sawtooth time 'ToothTime$_{new}$' is divided by 2 and a division result thereof is stored as 'ToothTime$_{recovered}$' in order to overcome such abnormalities. If the division result falls within a range of 30% as a result of comparison between the division result 'ToothTime$_{recovered}$' and the previous sawtooth time 'ToothTime$_{old}$', that is, if |(ToothTime$_{old}$−ToothTime$_{recovered}$)/ToothTime$_{old}$|<30%, the division result is doubled and is used in a next step instead of the current sawtooth time 'ToothTime$_{new}$'. If a change of the sawtooth time is too great, that is, if (ToothTime$_{old}$−ToothTime$_{recovered}$)/ToothTime$_{old}$≤−30%, sawtooth synchronization needs to be performed, a recovery task is no longer performed, and the division result 'ToothTime$_{recovered}$' is used in a subsequent step.

At step 608, the recovered sawtooth time 'ToothTime$_{recovered}$' is set as a sawtooth time that is used for comparison when a next wheel speed sensor signal is collected. That is, ToothTime$_{old}$=ToothTime$_{recovered}$.

At step 609, the current sawtooth time 'ToothTime$_{new}$' is set as a sawtooth time that is used for compassion when a next wheel speed sensor signal is collected. That is, ToothTime$_{old}$=ToothTime$_{new}$.

At step 610, the speed of the vehicle is determined. The speed of the vehicle may be provided by another control unit or may be measured using the sawtooth time of the wheel speed sensor. If the speed of the vehicle is less than a specific value, such as 20 mph (32 km/h), or more than a specific value, such as 75 mph (120 km/h), operation is no longer performed, and the process proceeds to step 611 in which a task for restarting initialization is performed. Meanwhile, if the speed of the vehicle falls within a specific range, the process proceeds to steps shown in FIG. 8 in which a calculated sawtooth time is used.

If the reverse gear is connected or the brake pedal is driven as at step 613, sawtooth synchronization needs to be executed. Information for such sawtooth synchronization is set.

At step 612, the current sawtooth time 'ToothTime$_{new}$' is set as a sawtooth time that is used for comparison when a next wheel speed sensor signal is collected. That is, ToothTime$_{old}$=ToothTime$_{new}$.

Figure 7:
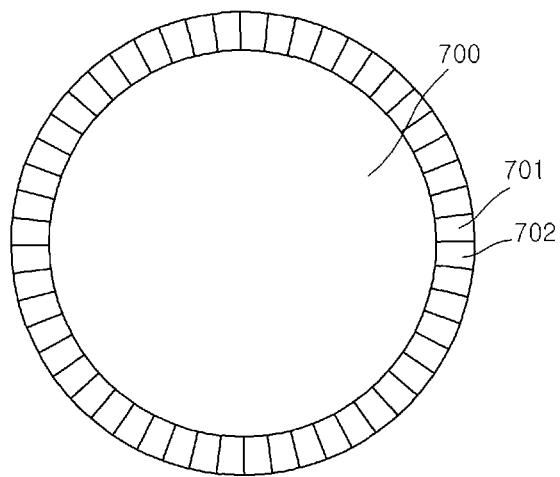
FIG. 7 is a diagram conceptually showing a circular buffer used in the present invention.

FIG. 7 is a diagram conceptually showing a circular buffer used in the present invention. In the present invention, a plurality of circular buffers 700 for storing data is used. The circular buffer 700 has both ends coupled and has a fixed capacity. An index provides information regarding that next data needs to be used where. For example, if the last data has been recorded on a region 701, next data will be recorded on a region 702. Whenever new data is recorded, an index indicative of a next slot is changed. If a circular buffer having a fixed capacity is fully filled, next data is overwritten into a next slot. Furthermore, a fill counter is used to indicate whether or not a circular buffer has been fully filled with data or whether or not a circular buffer has been initialized.

Figure 8:
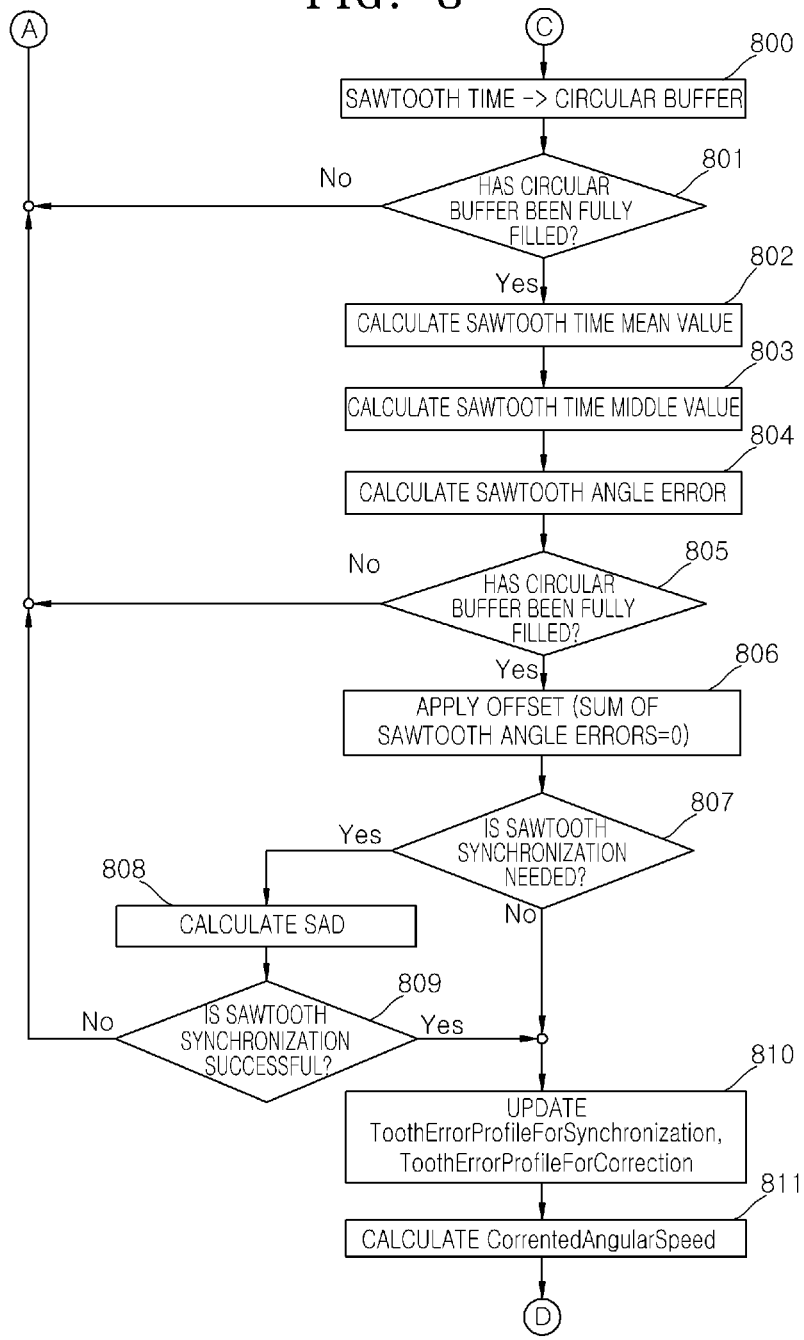
FIG. 8 is a flowchart illustrating a method of performing the mechanical error estimation and synchronization of sawteeth in accordance with the present invention.

FIG. 8 is a flowchart illustrating a method of performing the mechanical error estimation and synchronization of sawteeth in accordance with the present invention. The method of FIG. 8 is performed in succession from the process of FIG. 6. That is, a sawtooth time calculated in the process of FIG. 6 is filled in a circular buffer at step 800. Here, the capacity of the circular buffer corresponds to the number of sawteeth of a wheel speed sensor.

If the circular buffer is not fully filled, a subsequent process is not performed until the next rising edge of the wheel speed sensor is detected at step 801.

If the circular buffer is fully filled, a sawtooth time mean of totalities of buffer tooth times is calculated and is stored in another circular buffer called a mean circular buffer at step 802. If a number is assigned to each sawtooth, sawtooth times may be indicated by ToothTime$_{(i-number\ of\ teeth+1)}$, ..., ToothTime$_i$. The calculation mean is obtained by dividing the sum of sawtooth times, filled in a circular buffer, by a total number of sawteeth and is represented as Equation 1.

$$CurrentToothAvg_i = \frac{1}{numberOfTeeth} \sum_{j=i-numberOfTeeth+1}^{i} ToothTime_j \qquad [\text{Equation 1}]$$

$$= \frac{ToothTime_{(i-numberOfTeeth)+1} + ... + ToothTime_i}{numberOfTeeth}$$

At step 803, a sawtooth time, that is, a sawtooth time middle value placed in the middle of a set of data used to calculate the calculation mean 'CurrentToothAvg', is extracted and stored in a parameter 'CenteredToothTime' as shown in Equation 2.

$$CenteredToothTime_i = ToothTime_{(i-numberOfTeeth/2)} \qquad [\text{Equation 2}]$$

Figure 9:
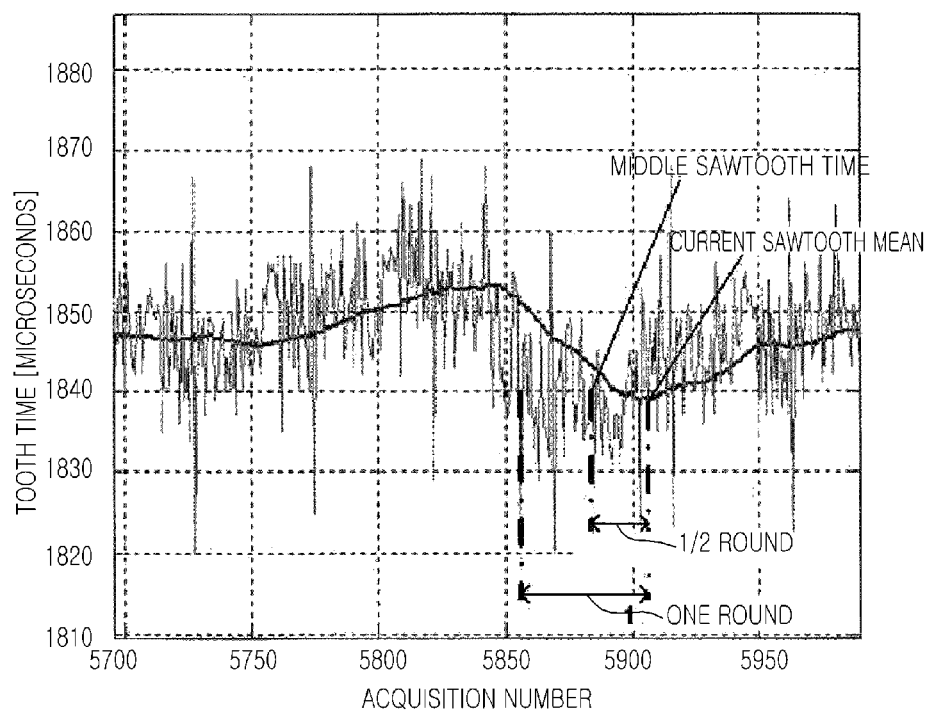
FIG. 9 is a graph showing a relationship between a central sawtooth time and a sawtooth time mean in accordance with the present invention.

As described with reference to FIG. 3, a difference between a 'CenteredToothTime' value and the calculation mean 'CurrentToothAvg' is used in order to calculate an error corresponding to each sawtooth because an interval between the sawteeth of the wheel speed sensor is not ideally constant. FIG. 9 shows a step for calculating the 'CenteredToothTime' value and the calculation mean 'CurrentToothAvg'.

At step 804, an error of a sawtooth angle corresponding to a value measured at 'CenteredToothTime' is calculated. Such calculation has been derived from the fact that the sum of sawtooth errors per a single round of 2π radian becomes 0. Accordingly, an error of each sawtooth can be calculated in accordance with Equation 3 using a difference between an arithmetic sawtooth time mean value (i.e., the time taken for one round/the number of sawteeth) and the sawtooth time middle value (i.e., the centered tooth time, that is, the time taken for a half round).

$$ToothAngle\ Error_i = \left( \frac{CenteredToothTime_i}{CurrentToothAvg_i} \times \frac{2\pi}{numberOfTeeth} \right) - \frac{2\pi}{numberOfTeeth} \qquad [\text{Equation 3}]$$

A 'CenteredToothTime' value, a 'CurrentToothAvg' value, and a 'ToothAngleError' value are stored in a mean circular buffer as the same index. The mean circular buffer has a capacity corresponding to the number of sawteeth of a wheel speed sensor.

At step 805, if the mean circular buffer is not fully filled, a subsequent process is not performed until a next rising edge is detected by the wheel speed sensor. If the circular buffer is fully filled, it means that the wheel speed sensor has been fully rotated by the number of sawteeth.

Accordingly, an offset value 'CorrectiveOffset' is applied so that the sum of all sawtooth angle errors becomes 0 at step 806. The corrective offset 'CorrectiveOffset' is calculated by adding all the sawtooth angle errors together as in Equation 4 below.

$$CorrectiveOffset = \sum_{k=1}^{numberOfTeeth} ToothAngleError_k \qquad [\text{Equation 4}]$$

Each of the sawtooth angle errors is determined by subtracting the corrective offset from each of the sawtooth angle errors as in Equation 5.

$$ToothAngl5eError_i = ToothAngleError_i - CorrectiveOffset \qquad [\text{Equation 5}]$$

At step 807, whether or not sawtooth synchronization needs to be performed. Sawtooth synchronization is associated with an offset between a sawtooth angle error profile 'ToothErrorProfileForSynchronization' for synchronization and a sawtooth angle error stored in the mean circular buffer and now monitored. If a sawteeth offset between the sawtooth angle error profile for synchronization and a monitored sawtooth angle error has been determined without being calculated, synchronization described with reference to step 808 is necessary.

At step 808, the sawtooth angle error stored in the mean circular buffer is compared with the sawtooth angle error profile for synchronization in order to check an offset that is best matched. Standard variance values of a sawtooth angle error and the sawtooth angle error profile for synchronization are compared with each other using the Sum of Absolute Differences (SAD) of each possible offset value between 0 and (numberOfTeeth−1) so that the standard variance values have the same degree.

The standard variance of the sawtooth angle error is calculated using Equation 6.

$$ToothAngleErrorsStdDeviation$$
$$=\sqrt{\frac{1}{numberOfTeeth}[(ToothAngleError_i - \mu)^2 + \ldots + (ToothAngleError_{numberOfTeeth} - \mu)^2]}$$ [Equation 6]

In Equation 6, $\mu$ is a mean value of sawtooth angle errors. If the mean value becomes 0 at step 806, a simple standard variation is represented as in Equation 7.

$$ToothAngleErrorsStdDeviation=$$
$$\sqrt{\frac{1}{numberOfTeeth}[ToothAngleError^2 + \ldots + (ToothAngleError_{numberOfTeeth})^2]}$$ [Equation 7]

The standard variance of the sawtooth angle error profile for synchronization is also calculated using the same method as in Equation 8.

$$ToothErrorProfileForSynchronizationStdDeviation=$$ [Equation 8]
$$\sqrt{\frac{1}{numberOfTeeth}[ToothErrorProfileForSynchronization^2 + \ldots + (ToothErrorProfileForSynchronization_{numberOfTeeth})^2]}$$

The SAD of each offset value between 0 and (numberOfTeeth−1) can be calculated as in Equation 9 below.

$$SADforOffset0 = \sum_{k=1}^{numberOfTeeth} \left( \left| \frac{ToothErrorProfileForSynchrozination_i}{ToothErrorProfileForSynchronizationStdDeviation} - \frac{ToothAngleError(i+0)}{ToothAngleErrorsStdDeviation} \right| \right)$$ [Equation 9]

$$SADforOffset1 = \sum_{k=1}^{numberOfTeeth} \left( \left| \frac{ToothErrorProfileForSynchrozination_i}{ToothErrorProfileForSynchronizationStdDeviation} - \frac{ToothAngleError(i+1)}{ToothAngleErrorsStdDeviation} \right| \right)$$

$$SADforOffset(numberOfTeeth-1) =$$
$$\sum_{k=1}^{numberOfTeeth} \left( \left| \frac{ToothErrorProfileForSynchrozination_i}{ToothErrorProfileForSynchronizationStdDeviation} - \frac{ToothAngleError(i+numberOfTeeth-1)}{ToothAngleErrorsStdDeviation} \right| \right)$$

An offset is set to an offset value at a position where a corresponding 'SADforOffset$_i$' becomes a minimum. If the same offset is continuously calculated three times, the offset value is finally determined and synchronized.

At step 809, the results of the sawtooth synchronization are determined. If, as a result of the determination, it is determined that the synchronization is not successful, a subsequent process is not performed until a next rising edge is detected by the wheel speed sensor. If, as a result of the determination, it is determined that the synchronization is successful, the process proceeds to step 810.

Figure 10:
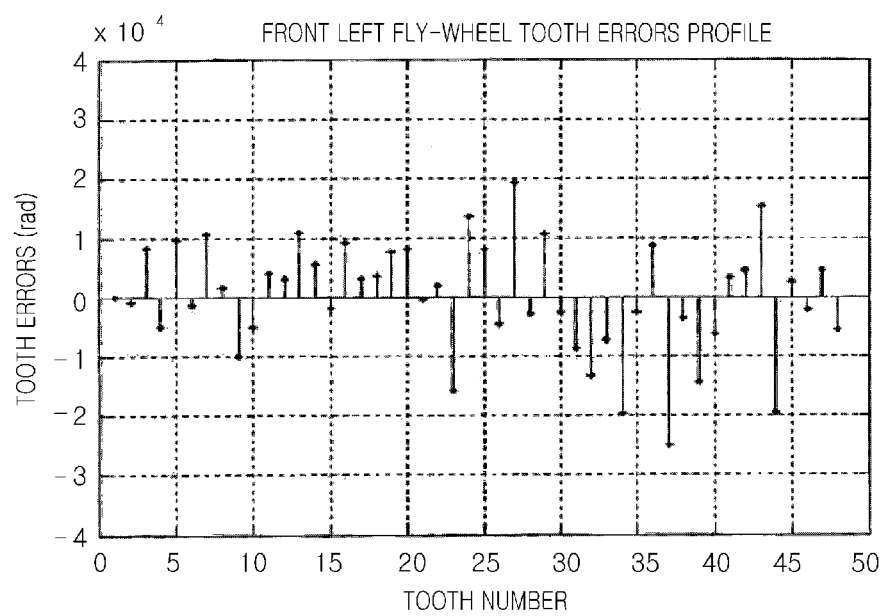
FIG. 10 is a table showing a sawtooth error profile in accordance with the present invention.

At step 810, the sawtooth error profile 'ToothErrorProfileForSynchronization' for synchronization and a sawtooth error profile 'ToothErrorProfileForCorrection' for correction are updated using the sawtooth synchronization index offset and the sawtooth angle error. FIG. 10 is a table showing a sawtooth error profile in accordance with the present invention and shows the sawtooth error profile for 48 sawteeth.

The sawtooth error profile for synchronization and the sawtooth error profile for correction are updated using a simple exponential smoothing method.

$$ToothErrorsProfileForSynchronization_{(i,t)} = \alpha_{synch} \cdot ToothAngleError_{(i+Offset,t)} + (1 - \alpha_{synch}) ToothErrorsProfileForSynchronization_{(i,t-1)}$$ [Equation 10]

In Equation 10, 'i' is the number of sawteeth, 'Offset' is an index offset distance between a sawtooth angle error and a corresponding sawtooth error profile for synchronization, 't' is a current result value, 't−1' is a previous result value, '$\alpha_{synch}$' is a smoothing factor used for the sawteeth error profile that is used for synchronization and updated, and the smoothing factor has a value between 0 and 1.

The smoothing of each sawtooth error i (i.e., from 1 to the number of sawteeth 'numberOfTeeth') of the sawtooth angle error profile for correction is represented as in Equation 11.

ToothErrorsProfileForCorrection$_{(i,t)}$=$\alpha_{corr}$ ToothAngleError$_{(i+Offset,t)}$+(1-$\alpha_{corr}$)ToothErrorsProfileForCorrection$_{(i,t-1)}$ [Equation 11]

In Equation 11, 'i' is the number of sawteeth, 'Offset' is an index offset distance between a sawtooth angle error and a corresponding sawtooth error profile for synchronization, 't' is a current result value, 't–1' is a previous result value, $\alpha_{corr}$ is a smoothing factor used for a sawteeth error profile that is used correction and updated, and the smoothing factor has a value between 0 and 1.

In the present invention, $\alpha_{synch}$>$\alpha_{corr}$ in which higher weight is assigned to a sawtooth angle error value for updating the synchronization profile which has recently been changed.

At step 811, an angular velocity at each sawtooth that is now rotated is calculated. The angular velocity is calculated by taking each sawtooth error and a sawtooth error estimation value stored in 'ToothErrorProfileForCorrection' into consideration. The calculated angular velocity is stored in 'CorrectedAngularSpeed', which is calculated in accordance with Equation 12 below.

$$CorrectedAngularSpeed_i = \frac{\left(\frac{2\pi}{numberOfTeeth} + ToothErrorProfileForCorrection_{i-Offset}\right) \times AquSamplingFrequency}{CenteredToothTime}$$ [Equation 12]

The corrected sawtooth time is calculated in accordance with Equation 13 below.

$$CorrectedToothTime_i = CenteredToothTime_i - \frac{CurrentToothAvg_i \times numberOfTeeth \times ToothErrorProfileForCorrection_{i-Offset}}{2\pi}$$ [Equation 13]

'CorrectedAngularSpeed' and 'CorrectedToothTime' are stored in the mean circular buffer. Subsequent processes are shown in FIG. 11.

Referring back to FIG. 9, FIG. 9 shows a relationship between a current sawtooth mean described with reference to steps 802 and 803 of FIG. 8 and a central sawtooth time. The current sawtooth mean is the calculation mean of sawtooth times that are collected for the single round of the wheel speed sensor, and the central sawtooth time is a sawtooth time when the wheel speed sensor is rotated by half prior to the last sawtooth time used to calculate the current sawtooth mean. Accordingly, the current sawtooth mean is calculated using 'numberOfTeeth' when sawtooth times are collected, data used to calculate the current sawtooth mean is not distributed around the mean value, and the calculation mean is more delayed than the last sawtooth time by a ½ sample width. In such a case, the calculation mean is more delayed than the last sawtooth signal by a 'numberOfTeeth/2' signal. Accordingly, a signal that is advanced by numberOfTeeth/2 more than the last signal used to calculate the central sawtooth time is used as the central sawtooth time.

FIG. 10 shows an example of the sawteeth error profile that has been estimated using the method described with reference to step 810 of FIG. 8.

Figure 11:
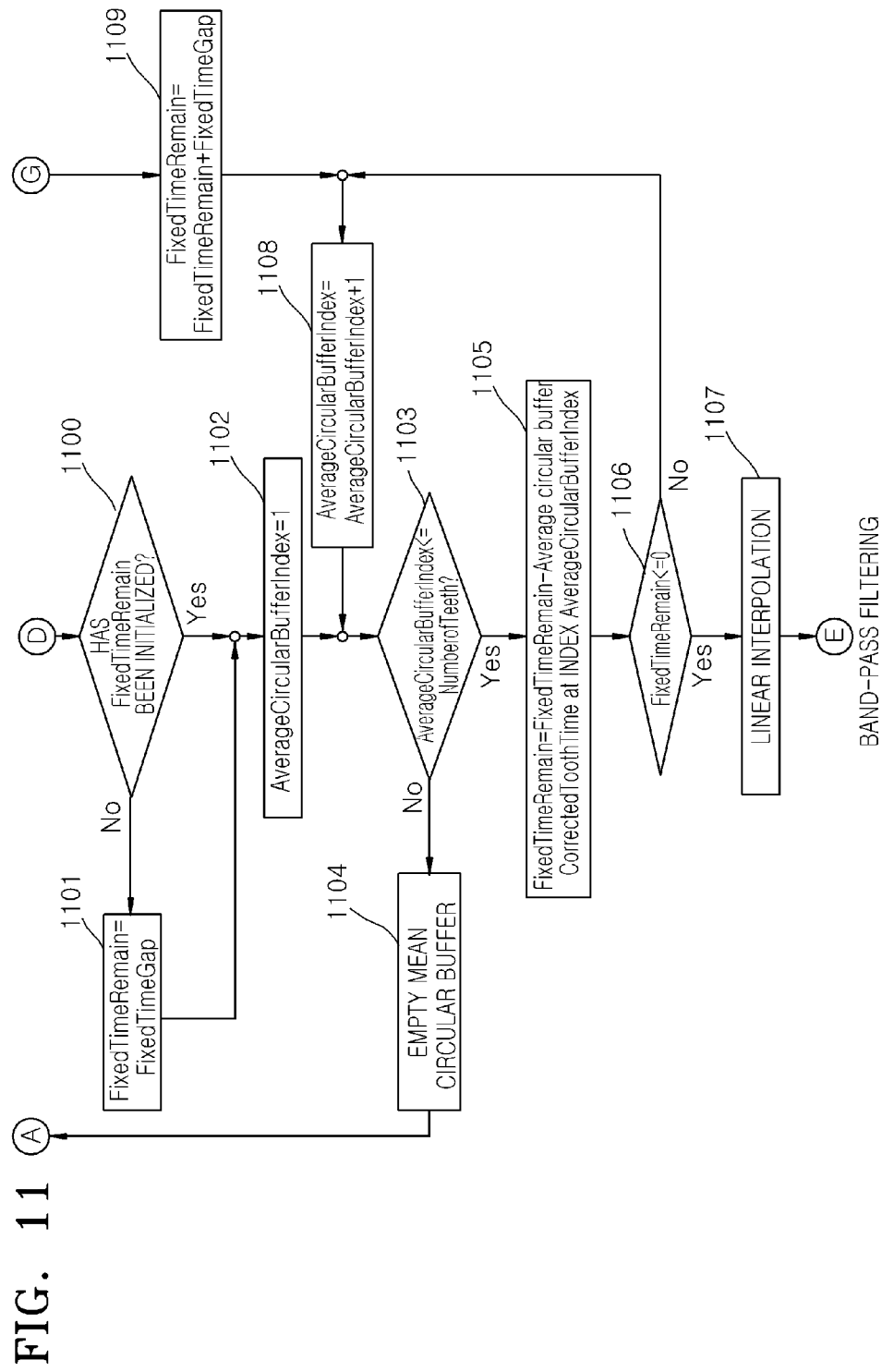
FIG. 11 is a flowchart illustrating a method of performing fixed time interpolation in accordance with the present invention.

FIG. 11 is a flowchart illustrating a method of performing fixed time interpolation in accordance with the present invention, which is described in connection with the method of FIG. 8. The current sawtooth mean, a central sawtooth time, a sawtooth angle error, a corrected angular velocity, and a corrected sawtooth time stored in the mean circular buffer are inputted to a fixed time interpolation routine.

At step 1100, whether or not a fixed time interpolation process has been initialized is determined. If, as a result of the determination, it is determined that the fixed time interpolation process has not been initialized, the process proceeds to step 1101 in which a parameter 'FixedTimeRemain' is initialized to a fixed time interval 'FixedTimeGap'. The fixed time interval 'FixedTimeGap' is a predetermined value corresponding to a fixed time interval. A fixed time interval in accordance with the Nyquist-Shannon sampling theory needs to be more than twice a minimum of an interested frequency (around 40 Hz) because a frequency estimator is formed of an inflection point counter. The fixed time interval 'FixedTimeGap' selected in the present invention is set to ½40 Hz that corresponds to the cycle of 4.166667 ms.

If the initialization is completed, all data sets stored in the mean circular buffer will be processed. In order to read the mean circular buffer, an index is set to 1 (i.e., AverageCircularBufferIndex=1) at step 1102. If all data stored in the mean circular buffer is processed, an end condition for a determination is processed at step 1103. The determination is performed by comparing the index with the number of sawteeth of a wheel speed sensor.

If all the data is processed, the mean circular buffer becomes empty at step 1104, and a subsequent process is no longer performed until a next rising edge is detected by the wheel speed sensor. If data to be processed is present, 'CorrectedToothTime' indicated by 'AverageCircularBufferIndex' is subtracted from 'FixedTimeRemain' at step 1105.

At step 1106, a 'FixedTimeRemain' value is compared with 0. If, as a result of the comparison, 0 is found to be greater than the 'FixedTimeRemain' value, the AverageCircularBufferIndex is increased in order to process a next data set at step 1108. If, as a result of the comparison at step 1106, the 'FixedTimeRemain' value is found to be equal to or smaller than 0, linear interpolation is performed at step 1107. The linear interpolation is interpolation between rotation speeds at a fixed time using two measurement points. One of the two measurement points was obtained prior to the fixed time, and the other of the two measurement points was obtained right after the fixed time. An interpolation point may be defined by Equation 14 below.

InterpolatedAngularSpeed$_j$=CorrectedAngularSpeed$_{(AverageCircularBufferIndex-1)}$+$\alpha_j$(CorrectedAngulatarSpeed$_{(AverageCircularBufferIndex-1)}$−CorrectedAngularSpeed$_{(AverageCircularBufferIndent)}$) [Equation 14]

In Equation 14, $\sigma_j$ is defined as in Equation 15 below.

$$\alpha_j = 1 + \frac{FixedTime\ \text{Remain}}{CorrectedToothTime_{(AverageCircularBufferIndex)}} \qquad \text{[Equation 15]}$$

Figure 13:
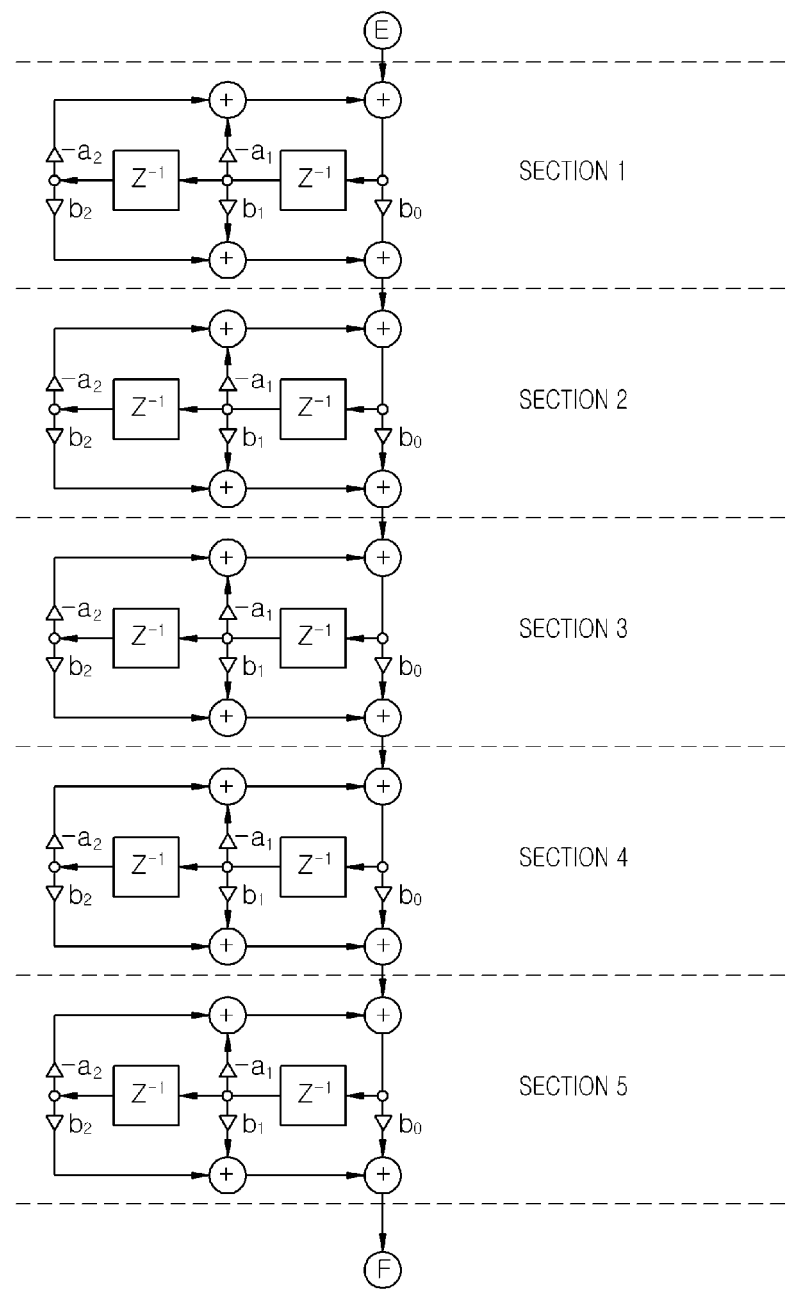
FIG. 13 is a block diagram showing a band-pass filter used in the present invention.

The results of the linear interpolation are inputted to the band-pass filter of FIG. 13. If band-pass filtering and frequency estimation are performed on the fixed time, a fixed time for next processing is set by adding the remaining fixed time and a fixed time interval (FixedTimeRemain=FixedTimeRemain+FixedTimeGap) together at step 1109.

Figure 12:
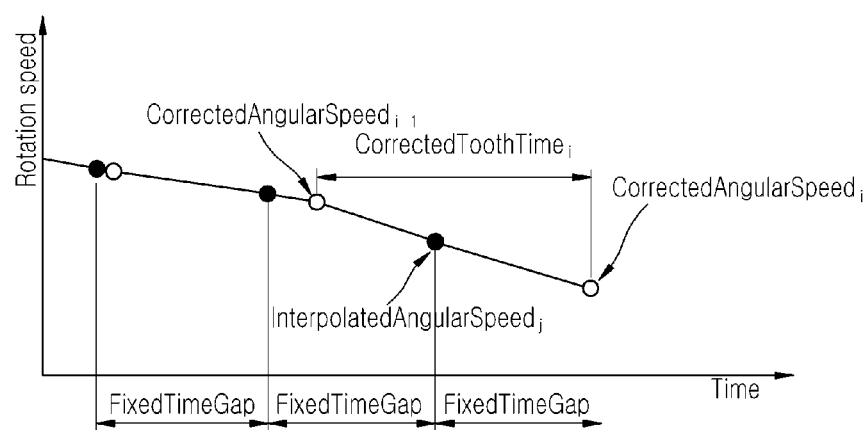
FIG. 12 is a graph showing a fixed time interpolation principle in accordance with the present invention.

FIG. 12 is a graph showing a fixed time interpolation principle in accordance with the present invention. First, 'CorrectedToothTime' and 'CorrectedAngularSpeed' have been stored in the mean circular buffer, and interpolation is performed at a fixed time interval 'FixedTimeGap' using the two values. Linear interpolation is performed on a previous angular velocity 'CorrectedAngularSpeed$_{i-1}$' and a current angular velocity 'CorrectedAngularSpeed$_i$' at the 'FixedTimeGap' interval for a time interval 'CorrectedToothTime$_i$' between two points.

FIG. 13 is a block diagram showing the band-pass filter used in the present invention. In the present invention, an elliptical band-pass filter that is known as a Cauer filter having a uniform ripple behavior in a pass band and a stop band is used. The elliptical band-pass filter has been selected so that a gain between the pass band and the stop band has a faster transition characteristic, but other filters may be used. The elliptical band-pass filter has Direct Form II that requires 10 delay units in 5 sections in each of which the two delay units are included.

In the present embodiment, assuming that the lowest frequency is 30 Hz, the highest frequency is 50 Hz, a stop frequency amplitude is 40 dB, and a pass frequency amplitude is 1 dB, the denominator and numerator of each section having a sample frequency of 240 Hz are set as follows.

Section 1:
$a_1$=−0.62039 $a_2$=0.88130
$b_0$=0.26573 $b_1$=−0.4255931680 $b_2$=0.26573
Section 2:
$a_1$=−1.26890 $a_2$=0.90503
$b_0$=0.26573 $b_1$=−0.0241203121 $b_2$=0.26573
Section 3:
$a_1$=−1.39890 $a_2$=0.97911
$b_0$=0.80234 $b_1$=−1.1917156020 $b_2$=0.80234
Section 4:
$a_1$=−0.51121 $a_2$=0.97159
$b_0$=0.80234 $b_1$=−0.3011182020 $b_2$=0.80234
Section 5:
$a_1$=−0.93838 $a_2$=0.81282
$b_0$=0.26812 $b_1$=0 $b_2$=−0.26812

The filtered output is stored in a parameter 'FixedTimeFilteredValue'.

FIG. 14 shows a frequency estimator in accordance with the present invention. A frequency is estimated by detecting stationary points having relative maxima over a specific time. In common mathematics, a stationary point having a relative maximum is a point at which an increase of a signal is stopped and thus a differential coefficient (i.e., tilt) becomes 0. In such a case, a cycle corresponds to the time between two maxima. In the present invention, a stationary point having a relative maximum is detected by detecting a 'FixedTimeFilteredValue$_i$' value at which an increase is stopped. In the present embodiment, a value indicated by a rectangle is a stationary point. In such a case, a cycle is measured by counting the number of fixed time intervals 'FixedTimeGap' between the stationary points.

An instant frequency 'InstantFrequency' is represented by a result value obtained by dividing the number of cycles between a cycle measurement start and a cycle measurement end by an accumulated parameter 'FixedTimeGap'. In the present invention, the instant frequency is calculated every 20 cycles.

Each frequency is estimated, and a sawtooth time when each frequency is estimated is stored in a parameter 'FrequToothTime'. Accordingly, a frequency associated with the speed of the vehicle can be corrected in a next step.

A block 1400 is a frequency estimator, and a graph 1401 shows how is a frequency estimated by detecting stationary points based on a 'FixedTimeFilteredValue$_i$' value. If a frequency is estimated, the process returns back to the fixed time interpolation process of FIG. 11.

FIG. 15 is a block diagram, a graph, and a table illustrating that rotation speed of a tire affects tire vibration in accordance with the present invention. A block 1500 shows a state in which the speed of the vehicle is corrected in an instant frequency. A table 1501 is a diagram showing vehicle velocities that affect instant tire vibration. Corrective factors shown in a graph 1502 are applied to the instant frequency. The corrective factors are calculated using a 2-D look-up table including pairs of a plurality of sawtooth time values and corresponding corrective factor values. Accordingly, in the look-up table, a corrective factor for a given sawtooth time 'FrequToothTime' is determined using a linear interpolation method between corrective factors corresponding to two adjacent sawtooth times. Next, an instant frequency is multiplied by the determined corrective factor.

Figure 16:
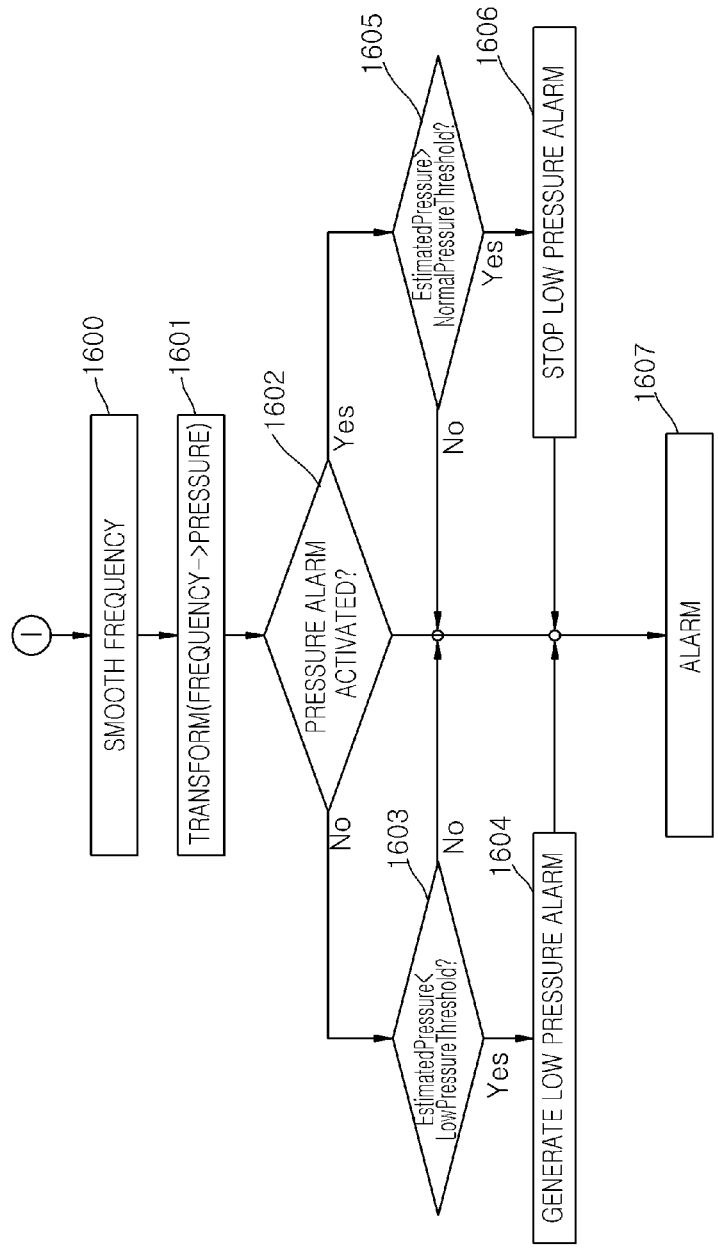
FIG. 16 is a flowchart illustrating a method of performing the determination of an alarm in accordance with the present invention.

FIG. 16 is a flowchart illustrating a method of performing the determination of an alarm in accordance with the present invention. A correction frequency obtained by multiplying an instant frequency by a corrective factor corresponding to a current sawtooth time is determined. The determined correction frequency is smoothed in accordance with an index smoothing method at step 1600.

At step 1601, the smoothed frequency is transformed into a corresponding pressure value. Such a transform relationship can be defined by a simple linear function. That is, Estimated pressure=smoothed frequency*change factor+transform offset A current alarm condition for low air pressure is determined at step 1602. If, as a result of the determination, it is determined that an alarm does not operate, the estimated pressure is compared with a low air pressure alarm threshold 'LowPressureThreshold' at step 1603. If, as a result of the comparison, the estimated pressure is found to be lower than the low air pressure alarm threshold, the generation of an alarm is determined at step 1604, and the alarm means generates an alarm at step 1607.

If, as a result of the determination at step 1602, it is determined that a low air pressure alarm now operates, the estimated pressure is compared with a normal air pressure alarm threshold 'NormalPressureThreshold' at step 1605. If, as a result of the comparison, the estimated pressure is found to be greater than the normal air pressure alarm threshold, the stop of the alarm is determined at step 1606, and the alarm means stops the alarm at step 1607.

In accordance with the present invention, the apparatus for estimating the conditions of tires mounted on a vehicle by combining signals generated from the wheel speed sensors, the brake sensor, and the reverse gear sensor mounted on the vehicle is implemented. Accordingly, there is an advantage in that a tire condition detection system can be implemented without using an additional and specific sensor.

Furthermore, there is an advantage in that the cost can be reduced using a conventional wheel speed sensor because a sawtooth angle error generated due to limited mechanical accuracy inherent in the existing wheel speed sensor is corrected and used.

Furthermore, the detection apparatus in accordance with the present invention has an advantage in that whether or not pressure within a vehicle tire is abnormal can be determined using a cheap calculation device for a short time.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. An apparatus for measuring rotation speed of tires of a vehicle, the apparatus comprising:
   a plurality of wheel speed sensors configured to generate signals corresponding to rotation speeds of the tires;
   a reverse gear sensor configured to generate a signal when a reverse gear operates;
   a brake sensor configured to generate a signal when a brake pedal operates; and
   a control unit configured to receive the signals from the plurality of wheel speed sensors, the reverse gear sensor, and the brake sensor, to calculate a signal error-corrected by estimating an error of a wheel speed sensor, to perform linear interpolation, and to determine the rotation speed of the tires.

2. The apparatus of claim 1, wherein the control unit further comprises:
   an input interface configured to receive the signals from the plurality of wheel speed sensors, the reverse gear sensor, and the brake sensor;
   a Central Processing Unit (CPU) configured to receive the signals from the plurality of sensors through the input interface and to perform operation for estimating rotation speed of the tires;
   ROM configured to store a program including instructions;
   RAM read by the CPU when the program is executed and configured to store temporary data; and
   E2PROM configured to store data for calibration, store result data of the operation, and store the data when power is turned off.

3. A method for detecting rotation speed of tires of a vehicle, the method comprising:
   receiving signals from a plurality of wheel speed sensors and operation sensors mounted on the vehicle and processing the received signals;
   estimating sawtooth angle errors related to mechanical defects of the wheel speed sensors;
   calculating a corrected sawtooth time and a corrected angular velocity of each of the wheel speed sensors using the estimated sawtooth angle errors;
   interpolating an angular velocity at a fixed time interval using the corrected sawtooth time and the corrected angular velocity; and
   determining rotation speed of each of the tires for a left front wheel, a right front wheel, a left rear wheel, and a right rear wheel mounted on the vehicle based on the interpolation of the angular velocity.

4. The method of claim 3, wherein receiving signals from a plurality of wheel speed sensors and operation sensors further comprises:
   discarding data if the speed of the vehicle is determined to be a specific speed or less or a brake pedal or a reverse gear is determined to be driven, and
   when detecting an abnormal sawtooth signal due to noise based on a change of a sawtooth time, recovering the abnormal sawtooth signal.

5. The method of claim 3, wherein estimating sawtooth angle errors further comprises:
   calculating a sawtooth angle error using a difference between a sawtooth time mean value and a sawtooth time middle value for one sawtooth,
   calculating a corrective offset by adding sawtooth angle errors for all sawteeth together, and
   estimating a sawtooth angle error for each of the sawteeth by subtracting the corrective offset from each of the sawtooth angle errors.

6. The method of claim 3, wherein calculating a corrected sawtooth time and a corrected angular velocity further comprises:
   calculating a corrective offset 'SADforOffset' using a standard variance of a sawteeth angle error profile for synchronization and a standard variance of a monitored sawtooth angle error, and
   correcting an error of each of the wheel speed sensors using the calculated corrective offset.

7. The method of claim 3, wherein interpolating an angular velocity further comprises calculating an interpolated angular velocity by performing linear interpolation on a corrected angular velocity value, corresponding to a corrected sawtooth time, at a fixed time interval.

8. The method of claim 3, wherein the method further comprises:
   filtering an interpolated signal in order to remove torsional vibration of a corresponding tire from the interpolated signal;
   estimating a vibration resonant frequency of the corresponding tire by counting stationary points from the filtered signal; and
   correcting the vibration resonant frequency that is an output value of the frequency analysis step in order to compensate for an influence of a speed of the vehicle.

9. The method of claim 8, wherein correcting the vibration resonant frequency further comprises calculating a corrective factor using a two-dimensional look-up table comprising pairs of a plurality of sawtooth time values and corresponding corrective factor values.

10. A system for measuring rotation speed of tires of a vehicle, the system comprising:
    a wheel speed sensor unit configured to generate signals corresponding to rotation speeds of the tires;
    a reverse gear sensor unit configured to generate a signal when a reverse gear operates;
    a brake sensor unit configured to generate a signal when a brake pedal operates; and
    a control unit configured to receive the signals from the plurality of wheel speed sensors, the reverse gear sensor, and the brake sensor, to calculate an signal error-corrected by estimating an error of a wheel speed sensor, to perform linear interpolation, and to determine the rotation speed of the tires.

11. The system of claim 10, wherein the system further comprises a device configured to indicate the rotation speed of the tires based on the determination of the control unit.

* * * * *